United States Patent
Gimnich et al.

(10) Patent No.: US 9,298,425 B2
(45) Date of Patent: *Mar. 29, 2016

(54) REQUIREMENTS FACTORIZATION MECHANISM

(71) Applicant: International Business Machines Corporation, Armonk, NY (US)

(72) Inventors: Rainer Gimnich, Munstermaifeld (DE); Dirk C. Michelsen, Hamburg (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/506,938

(22) Filed: Oct. 6, 2014

(65) Prior Publication Data

US 2015/0199181 A1 Jul. 16, 2015

Related U.S. Application Data

(63) Continuation of application No. 14/155,433, filed on Jan. 15, 2014, now Pat. No. 9,086,824.

(51) Int. Cl.
  *G06F 9/44* (2006.01)

(52) U.S. Cl.
  CPC ... *G06F 8/10* (2013.01); *G06F 8/20* (2013.01)

(58) Field of Classification Search
  None
  See application file for complete search history.

(56) References Cited

U.S. PATENT DOCUMENTS

| | | |
|---|---|---|
| 7,657,542 B2 | 2/2010 | Sundararajan et al. |
| 8,375,352 B2 | 2/2013 | Rheaume |
| 8,442,985 B2 | 5/2013 | Verma et al. |
| 8,572,567 B2 | 10/2013 | Wei et al. |
| 2005/0246656 A1 | 11/2005 | Vasilev et al. |
| 2006/0122875 A1* | 6/2006 | Kolbe ............... 705/8 |
| 2010/0083215 A1 | 4/2010 | Bogl et al. |
| 2010/0306732 A1 | 12/2010 | Zhu |
| 2011/0099532 A1 | 4/2011 | Coldicott et al. |

(Continued)

OTHER PUBLICATIONS

Akiyama et al., "Factors and Factorizations of Graphs", Version 1.0, Jun. 2007. http://citeseerx.ist.psu.edu/viewdoc/download?doi=10.1.1.107.4301&rep=rep1&type=pdf DOI: 10.1.1.107.4301.

(Continued)

*Primary Examiner* — Wei Zhen
*Assistant Examiner* — Daxin Wu
(74) *Attorney, Agent, or Firm* — Richard A. Wilhelm; Ryan Lewis

(57) ABSTRACT

Requirement terms and a glossary having requirement terms with matching requirement term synonyms are received. It is determined whether a first requirement term is identical to a second requirement term in the glossary. The first requirement term that is identical to the second requirement term is replaced by the synonym of the second requirement. A first graph is generated having requirement term synonyms. A relationship strength is determined between the requirement term synonym nodes. The matching requirement term synonyms are grouped into clusters based on the relationship strength between the nodes. The clusters are separated into modules based on relationship strength between the nodes and a maximum number of requirements allowed in each module. A second graph of modules is generated. The second graph is translated into human-readable documents and machine-readable files and the machine-readable files are exported to a software design tool.

7 Claims, 6 Drawing Sheets

(56) References Cited

U.S. PATENT DOCUMENTS

| | | |
|---|---|---|
| 2011/0099536 A1 | 4/2011 | Coldicott et al. |
| 2011/0314369 A1 | 12/2011 | Wei et al. |
| 2013/0060546 A1 | 3/2013 | Berenbach et al. |
| 2013/0167106 A1 | 6/2013 | Sinha |
| 2014/0007041 A1 | 1/2014 | Schmeling et al. |

OTHER PUBLICATIONS

Berry, D., "Ambiguity in Natural Language Requirements Specifications", Daniel M. Berry's Homepage, University of Waterloo, Computer Science Department, Revised Jul. 1, 2003. http:www.cs.uwaterloo.ca/~dberry/ambiguity.res.html.

Boness et al., "A Practical Approach to Goal Modelling for Time-Constrained Projects", 1st International Workshop on Requirements Engineering of Information Systems for the Digital Economy (REISDE), 2nd ICETE International Conference on e-Business and Telecommunications, 2005. cct.brookes.ac.uk/staff/resources/rachelharrison/A-Practical-Approach-to-Goal-Modelling-for-Time-Constrained-Projects.pdf.

Brandozzi et al., "Transforming Goal Oriented Requirement Specifications into Architecture Prescriptions", Proceedings of the First International Workshop From Software Requirements to Architectures—STRAW'01, pp. 54-61. http://www.cin.ufpe.br/~straw01/docs/straw01-camera-ready.pdf#page=59.

De Almeida Ferreira et al., "A Controlled Natural Language Approach for Integrating Requirements and Model-Driven Engineering", 2009 Fourth International Conference on Software Engineering Advances, pp. 518-523, © 2009 IEEE. DOI: 10.1109/ICSEA.2009.81.

Duan, C., "Clustering and it's Application in Requirements Engineering", Technical Reports, Paper 7, Apr. 1, 2008, DePaul University, pp. 1-27. http://via.library.depaul.edu/tr/7.

Fowler, M., "Refactoring: improving the design of existing code", Addison-Wesley Longman Publishing Co. Inc., Boston, MA, © 1999.

"Graph Factorization", Wikipedia, (last modified Apr. 29, 2013, printed Jul. 9, 2013). http://en.wikipedia.org/wiki/Graph_factorization.

Heim et al., "Graph-based Visualization of Requirements Relationships", 2008 Requirements Engineering Visualization (REV'08), © 2008 IEEE. http://interactivesystems.info/system/pdfs/79/original/19280.pdf?1310045425 DOI: 10.1109/REV.2008.2.

"How to Perform Refactoring", Visual Paradigm Know-how, Posted Jun. 23, 2011. http://knowhow.visual-paradigm.com/business-process-modeling/the-refactoring-feature/.

IBM, "Refactoring a business process", WebSphere Integration Developer, IBM, © Copyright IBM Corporation 2005, 2006. http://publib.boulder.ibm.com/infocenter/dmndhelp/vbrxmx/index.jsp?topic=/com.ibm.wbit.help.bpel.ui.doc/tasks/trefact.html.

Jois, C.P., "Refactoring Considerations for Service-Enabling Applications", SOA Magazine, Issue XVI, Published Mar. 13, 2008, Copyright © 2006-2013 Arcitura Education Inc. www.servicetechmag.com/I16/0308-3

Kapustin, A., "Requirement Modeling: The Process", Cybernetic Intelligence, P-RMP-2004-05-1-0, © 2008-2013 Cybernetic Intelligence Gmbh, Posted Nov. 9, 2008. www.cybernetic.org/contents/en/research.php.

Kof, L., "Natural Language Processing for Requirements Engineering: Applicability to Large Requirements Documents", Aug. 23, 2004. DOI: 10.1.1.61.5849.

Liu, W., "Refactoring-based Requirements Refinement Towards Design", Thesis for Doctor of Philosophy, Graduate Department of Computer Science, University of Toronto, 2009, Copyright © 2009 by Wendy WenQian Liu. https://tspace.library.utoronto.ca/bitstream/1807/19055/1/Liu_WenQian_200911_PhD.thesis.pdf.

Ramos et al., "Improving the Quality of Requirements with Refactoring", VI Brazilian Symposium on Software Quality (SBQS 2007), pp. 141-155. http://www.univasf.edu.br/~ricardo.aramos/publicacoes/Ramos_SBQS2007.pdf.

"Requirements Engineering", http://bohknet.tm.tue.nl/OHKNET/section32/RQIRequirementsEngineering.htm.

Rolland et al., "A Natural Language Approach for Requirements Engineering", 1992, pp. 1-29, © 2007-2010 The Pennsylvania State University. http://citeceerxist.psu.edu/viewdoc/summary:doi=10.1.1.52.1277

Wambler, S., "Agile Best Practices for Data Warehousing (DW)/Business Intelligence (BI) Projects", Agile Data, Copyright 2002-2013 Ambysofl Inc. http://www.agiledata.org/essays/dataWarehousingBestPractices.html.

Wiederhold, G., "Glossary: Intelligent Integration of Information", Journal of Intelligent Information Systems, vol. 6, Issue 2-3, pp. 281-291, Springer, 1996, © 1996 Kluwer Academic Publishers, Boston.

Wiegers, K., "So You Want to Be a Requirements Analyst?", Process Impact.com, pp. 1-6, © 2003 by Karl E. Wiegers, (Originally published in Software Development, vol. 11, No. 7, Jul. 2003). http://www.processimpact.com/articles/be_analyst.pdf.

Zeng et al., "PRV: An Approach to Process Model Refactoring in Evolving Process-Aware Information Systems", 2010 IEEE International Conference on Services Computing, pp. 441-448, © 2010 IEEE. DOI: 10.1109/SCC.2010.19.

Gimnich et al., "Requirements Factorization Mechanism", U.S. Appl. No. 14/155,433, filed Jan. 15, 2014.

Unknown, "Requirements Engineering," pp. 1-4, Jul. 9, 2013 http://bohknet.tm.tue.nl/OHKNET/section32/RQIRequirementsEngineering.htm.

\* cited by examiner

REQUIREMENTS FACTORIZATION MECHANISM

BACKGROUND

This disclosure relates generally to the process of transforming requirements into a system design. The current state of art consists of a discipline called "Requirement Management" supported by "Requirement Management Tools" and of a discipline called "System Design or Software Modeling" supported by "Software Design Tools". Currently a system designer uses "Requirement Management Tools" to get an overview of all the requirements and manually transforms this into a module structure as input for the "Software Design Tools".

SUMMARY

This disclosure relates to a semi-automatized system, method, and computer program product to transform requirements into a system design. By taking requirements from a requirements management tool, structuring the requirements, and putting the requirements into a software design tool a connection may be provided between requirements management and software modeling.

Disclosed herein are embodiments of a method of factorizing a set of requirements. In various embodiments, the method may include receiving a first plurality of requirement terms. In addition, the method may include receiving a glossary having a second plurality of requirement terms with matching requirement term synonyms. The method may also include determining whether a first requirement term from the first plurality of requirement terms is identical to a second requirement term in the glossary. Also, the method may include replacing the first requirement term with a matching requirement term synonym of the second requirement term based on the first requirement term being identical to the second requirement term. The method may also include generating a first graph having a plurality of matching requirement term synonyms represented by nodes connected by lines, each line representing a type of relationship. In addition, the method may include determining a relationship strength between the nodes connected based on the type of relationship represented by the lines connecting the nodes. Also, the method may include grouping the plurality of matching requirement term synonyms into one or more clusters based on the relationship strength between the nodes. The method may also include separating the one or more clusters into one or more modules based on relationship strength between the nodes and a maximum number of requirements allowed in each module. Consistent with various embodiments, the method may also include generating a second graph having the one or more modules. The method may also include translating the second graph into human-readable documents and machine-readable files. Furthermore, the method may include exporting the machine-readable files to a software design tool.

Also disclosed herein are embodiments of a system for factorizing a set of requirements. In various embodiments, the system may include a catalog normalizer configured to receive a first plurality of requirement terms and receive a glossary having a second plurality of requirement terms with matching requirement term synonyms. The catalog normalizer may also be configured to determine whether a first requirement term from the first plurality of requirement terms is identical to a second requirement term in the glossary and replace the first requirement term with a matching requirement term synonym of the second requirement term based on the first requirement term being identical to the second requirement term. In addition, the system may also include a graph generator configured to generate a first graph having a plurality of matching requirement term synonyms represented by nodes connected by lines, each line representing a type of relationship. The system may also include a graph factorizer configured to determine a relationship strength between the nodes connected based on the type of relationship represented by the lines connecting the nodes and group the plurality of matching requirement term synonyms into one or more clusters based on the relationship strength between the nodes. Furthermore, the system may include an output generator configured to separate the one or more clusters into one or more modules based on relationship strength between the nodes and a maximum number of requirements allowed in each module and generate a second graph having the one or more modules. The output generator may also be configured to translate the second graph into human-readable documents and machine-readable files and export the machine-readable files to a software design tool.

Also disclosed herein are embodiments of a computer program product configured to factorize a set of requirements. In various embodiments, the computer program product may receive a first plurality of requirement terms. In addition, the computer program product may receive a glossary having a second plurality of requirement terms with matching requirement term synonyms. The computer program product may also determine whether a first requirement term from the first plurality of requirement terms is identical to a second requirement term in the glossary. Also, the computer program product may replace the first requirement term with a matching requirement term synonym of the second requirement term based on the first requirement term being identical to the second requirement term. Consistent with various embodiments, the computer program product may generate a first graph having a plurality of matching requirement term synonyms represented by nodes connected by lines, each line representing a type of relationship. In addition, the computer program product may determine a relationship strength between the nodes connected based on the type of relationship represented by the lines connecting the nodes. In various embodiments, the computer program product may group the plurality of matching requirement term synonyms into one or more clusters based on the relationship strength between the nodes. The computer program product may also separate the one or more clusters into one or more modules based on relationship strength between the nodes and a maximum number of requirements allowed in each module. Also, the computer program product may generate a second graph having the one or more modules. In addition, the computer program product may translate the second graph into human-readable documents and machine-readable files. Furthermore, the computer program product may export the machine-readable files to a software design tool.

DETAILED DESCRIPTION

Figure 1:
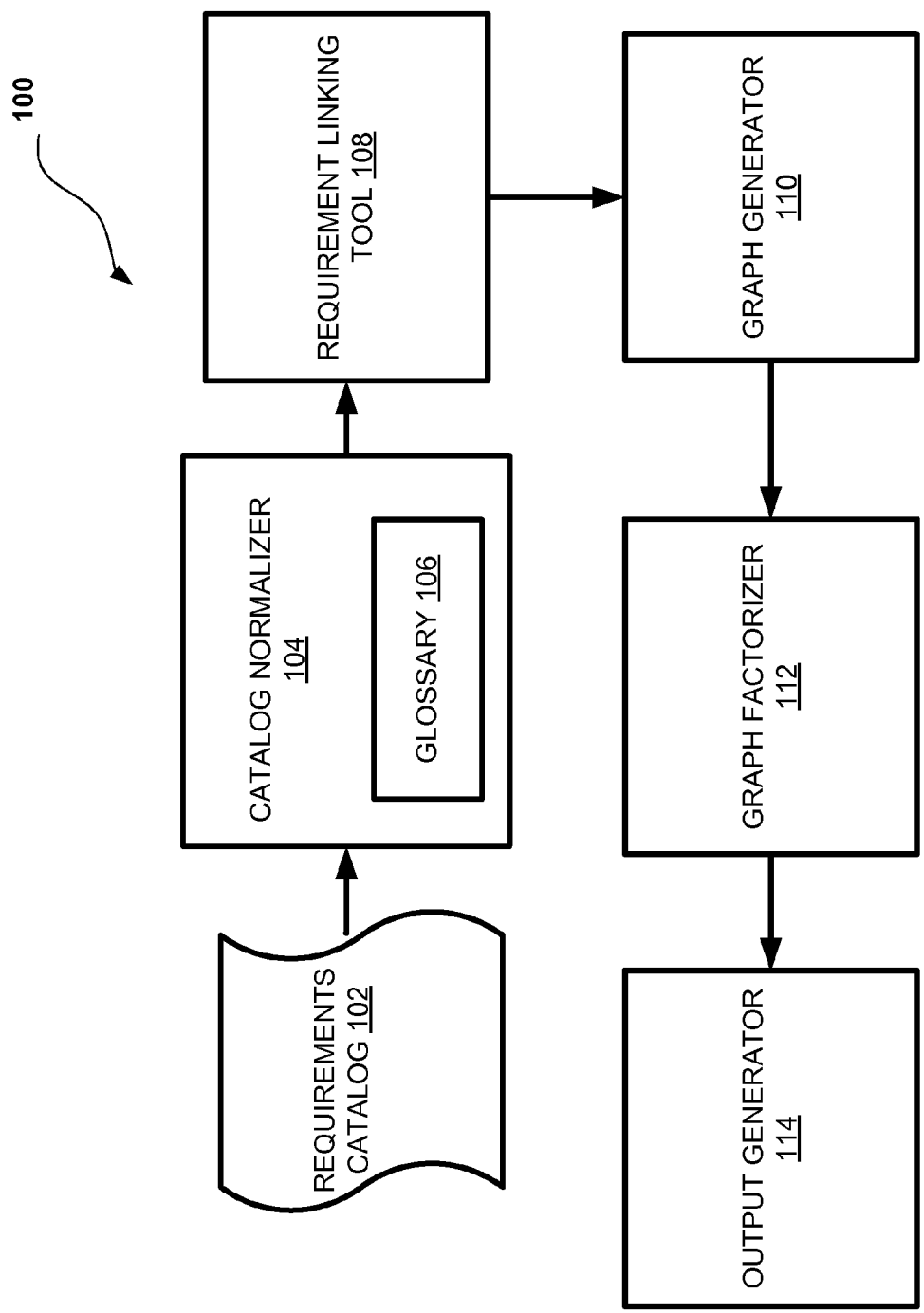
FIG. 1 depicts a system for a requirements factorization mechanism, consistent with embodiments of the present disclosure

Many projects have requirements consisting of several hundred, sometimes thousands of separate requirements usually found in a requirements catalog. This catalog usually does not have the appropriate structure for processing and transforming into a system design. For a systematic processing of a requirements catalog and automatic generation of clusters and modules may be required, where every requirement may be connected to one or many modules. The present disclosure relates to a requirements factorization mechanism, that gets requirements from a requirements management tool, builds and factorizes a requirements graph, generates a hierarchical cluster requirements graph and puts them into a software design tool. By using the mechanism, requirements may be factorized in such a way that the design, development, and implementation of the requirements is improved by the appropriate structure.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," or "system." Furthermore, the present disclosure may take the form of a computer program product embodied in a tangible medium of expression having computer usable program code embodied in the medium.

Various combinations of one or more computer usable or computer readable medium(s) may be utilized. The computer-usable or computer-readable medium may be, for example, an electronic, magnetic, optical, electromagnetic, infrared, or semiconductor system, apparatus, device, or other propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be a medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using an appropriate medium, including but not limited to wireless, wireline, optical fiber cable, RF, etc.

Computer program code for carrying out operations of the present disclosure may be written in various combinations of one or more programming languages, including an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through various types of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 depicts a system 100 for a requirements factorization mechanism, consistent with embodiments of the present disclosure. The system 100 may include a requirements catalog 102, a catalog normalizer 104, a requirement linking tool 108, a graph generator 110, a graph factorizer 112, and an output generator 114.

The requirements catalog 102 is included to be representative of a list of natural language requirements and may include a requirements definition text document, an export from a requirements management tool, and the like. Requirements are the starting point for every project. A requirement can be considered a detailed view of a need under consideration. A requirement may be anything from an abstract need to a pre-planned implementation detail of a system. In terms of software engineering, a requirement may be a condition or capability needed by a user to solve a problem or achieve an objective. A requirement may also be a condition or capability that must be met or possessed by a system or system component to satisfy a contract, standard, specification, or other formally imposed documents; or a documented representation of a condition or capability, for example. Requirements Management may be considered the management of requirements essentially from when a customer provides the needs or a product development process is started.

Illustratively, the requirements catalog 102 may be the input to the catalog normalizer 104. As shown in FIG. 1, the catalog normalizer 104 may include a glossary 106. A glossary 106 may enable authoring, management, and sharing of business terms. The glossary 106 may have a collection of business terms, words, or phrases that can be used to classify and group requirements. Furthermore, the glossary 106 may enable the catalog normalizer 104 to normalize the requirements catalog by translating requirements into their equivalent business term synonyms that have been accumulated in the glossary 106. Translating requirements into their equivalent business term synonyms may be accomplished through the use of business metadata.

Business metadata may include business terms and their definitions, examples of usage, business rules policies, and constraints. Altogether they define the semantics of a business concept and its realization in physical data assets. Users of business metadata are primarily business users, but anyone may use it to understand what things mean. Business metadata may be expressed in a language that is spoken and understood by business people, which means spelling out terms fully and making sure that definitions are clear and unambiguous. Business metadata may be expressed in plain language in which may avoid complex expressions, formalities, abbreviations, mathematical expressions, or functional expressions. Business metadata may be extended to add additional text or statements around a particular word. For example, business metadata may be created that would help better define a business term or terms that would be more useful for generating reports to a functional and technical team.

As shown in FIG. 1, once the requirements have been normalized, the catalog normalizer 104 may transfer the normalized requirements catalog to the requirement linking tool 108 that may "link" the normalized requirements to one another. Requirements may be often related to one another. Visually, a relationship may be shown as a link between two requirements. A traceability relationship may refer to relationships between requirements and between requirements and solutions. The goal of tracing may be to ensure that requirements are linked back to an objective or need. Requirements may be traced for several reasons. For example, the needs of the customers may be traced forward to requirements, so that it can be seen which requirements will be affected if those needs change. The requirements may then be traced forward from requirements to the product elements. Forward requirements traceability offers a means to tie needs to actual requirements and actual requirements to deliverables. Conversely, product elements may be traced backward to requirements, so that it can be seen why each item was created and then trace backward from requirements to customer needs, to identify the origin of each software requirement. Backward traceability may ensure that if a product feature is developed that no one remembers asking for or authorizing, it can be determined whether the feature is tied to a requirement and a business need.

A relationship may take on many facets and relationships may vary on how they are constructed, what rules apply to them, and what attributes they exhibit. There may be many different types of relationships, such as "requirement A is fulfilled by requirement B," or "requirement A is part of requirement B," or "requirement A is derived from requirement B," etc. Furthermore, there may be different types of relationships based upon the types of requirements that are being related.

Illustratively, the requirement linking tool 108 may transfer the linked normalized requirements catalog to the graph generator 110. The graph generator 400 may analyze the various relationships between the requirements from the normalized requirements catalog and produce a requirements graph. The graph may contain a set of nodes, each node representing a normalized requirement, and a set of lines linking or connecting the nodes, each line representing a relationship between two normalized requirements (as seen in FIG. 2). Furthermore, multiple lines may exist between the same nodes.

Consistent with various embodiments, the graph generator 110 may transfer the requirements graph to the graph factorizer 112. The graph factorizer 112 may operate on the requirements graph and determine clusters of the requirements within the graph by using factorization clustering techniques. When using factorization clustering techniques, the classification of the requirements may determine how the requirements are clustered together.

Factorization clustering may be a method for finding structures or clusters in a graph. The technique arranges the graph into groups according to specified classification similarities. Taxonomy is the practice and science of classification and may refer to a classification of things or concepts, as well as to the principles underlying such a classification. Natural language processing (NLP) is a field of computer science and linguistics concerned with the interactions between computers and human (natural) languages. Many challenges in NLP involve enabling computers to derive definitions and the principles underlying human language. Consistent with certain embodiments, the graph factorizer 112 may find taxonomies of the normalized requirements based on the definitions of relationships determined by the requirement linking tool 108. The graph factorizer 112 may then determine classification similarities between the normalized requirements and create cluster formations accordingly.

For example, as stated herein, nodes may represent requirements and a line or link may exist between two nodes if a relationship such as "requirement A is fulfilled by requirement B," or "requirement A is part of requirement B," or "requirement A is derived from requirement B," etc., exists between the normalized requirements. Weight or cohesion strength may be given to the different semantic relationships and the graph factorizer 112 may analyze the nodes and links of the requirements graph. The graph factorizer 112 may then cluster the nodes based upon the factorization of the weights or cohesions strengths of the links and output a tree structure or dendrogram, illustrating a cluster requirements graph. However, this example is for illustrative purposes only. There are many possible weights an algorithm may use for factorization clustering. The specific weight used may be dictated by the data as well as considerations for computational speed. Additionally, the clusters formed may be highly dependent on the choice of weighting and various weighting techniques may have varying degrees of success.

Illustratively, the cluster requirements graph may be transferred to an output generator 114. The output generator 114 may take the cluster requirements graph and may "cut" the cluster requirements graph at non-existence or "weak" links and separate the clusters into their own modules to produce a hierarchical cluster requirements graph. Links that are cut may be dependent upon the system such as a cohesion strength threshold value, user-defined cohesions strengths, a default cohesion strength, etc. Furthermore, there may be a maximum number of requirements allowed in each module. This maximum number may be dependent on a parameter that may be determined by a system dependent threshold value, a user-defined threshold value, a default value, etc. In an embodiment, there may be a parameter that indicates the maximum number of nodes in a cluster. In a case where a cluster is too big, the output generator 114, may look for weak links in the cluster requirements graph to cut.

The hierarchical cluster requirements graph may be produced as a printable document, may be used by project managers, IT architects, developers, testers, etc. The hierarchical cluster requirements graph may also be produced as machine-readable files to be imported into a project management tool, the software development environment, the test data generator, etc.

Figure 2A:
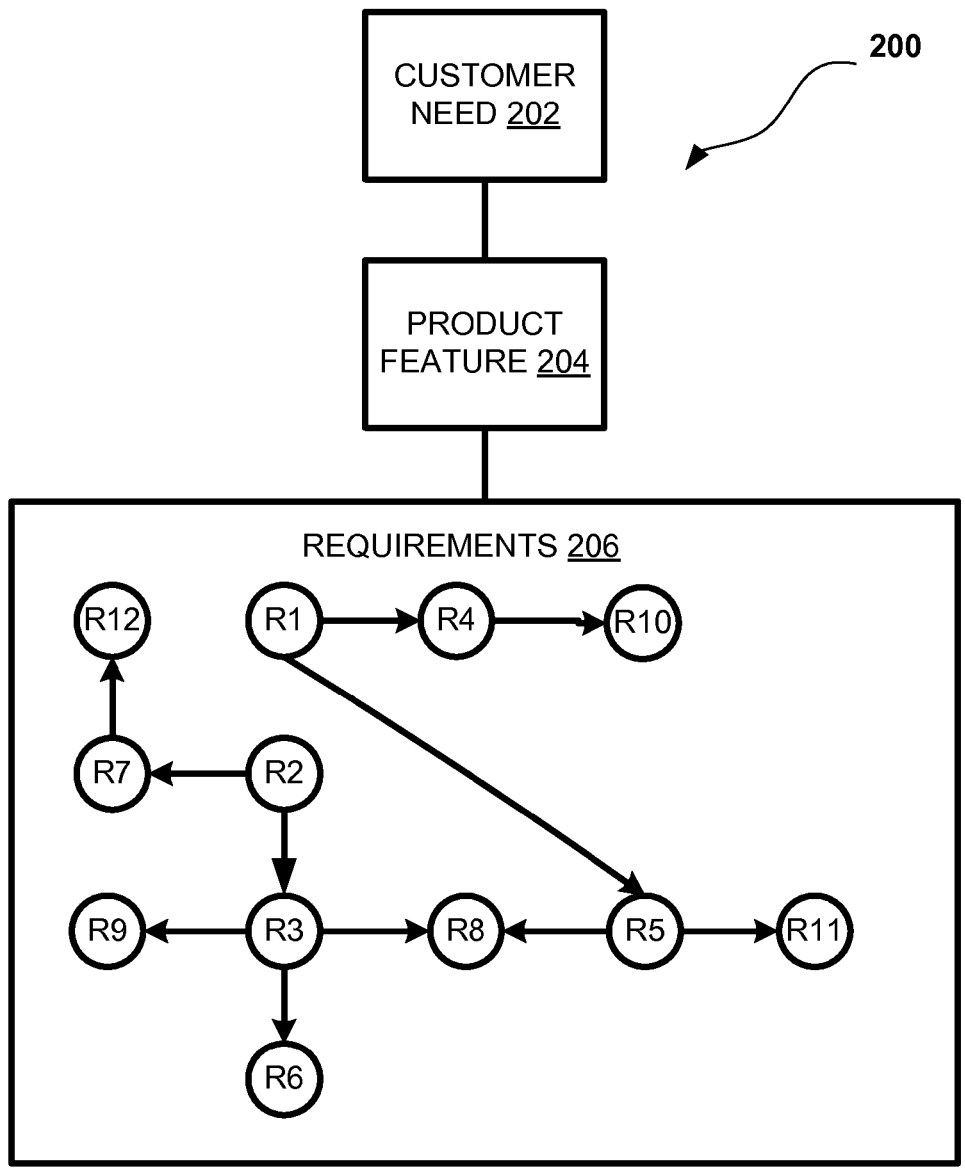
FIG. 2A depicts an input normalized requirements graph used to generate a hierarchical cluster requirements graph, consistent with embodiments of the present disclosure.
Figure 2B:
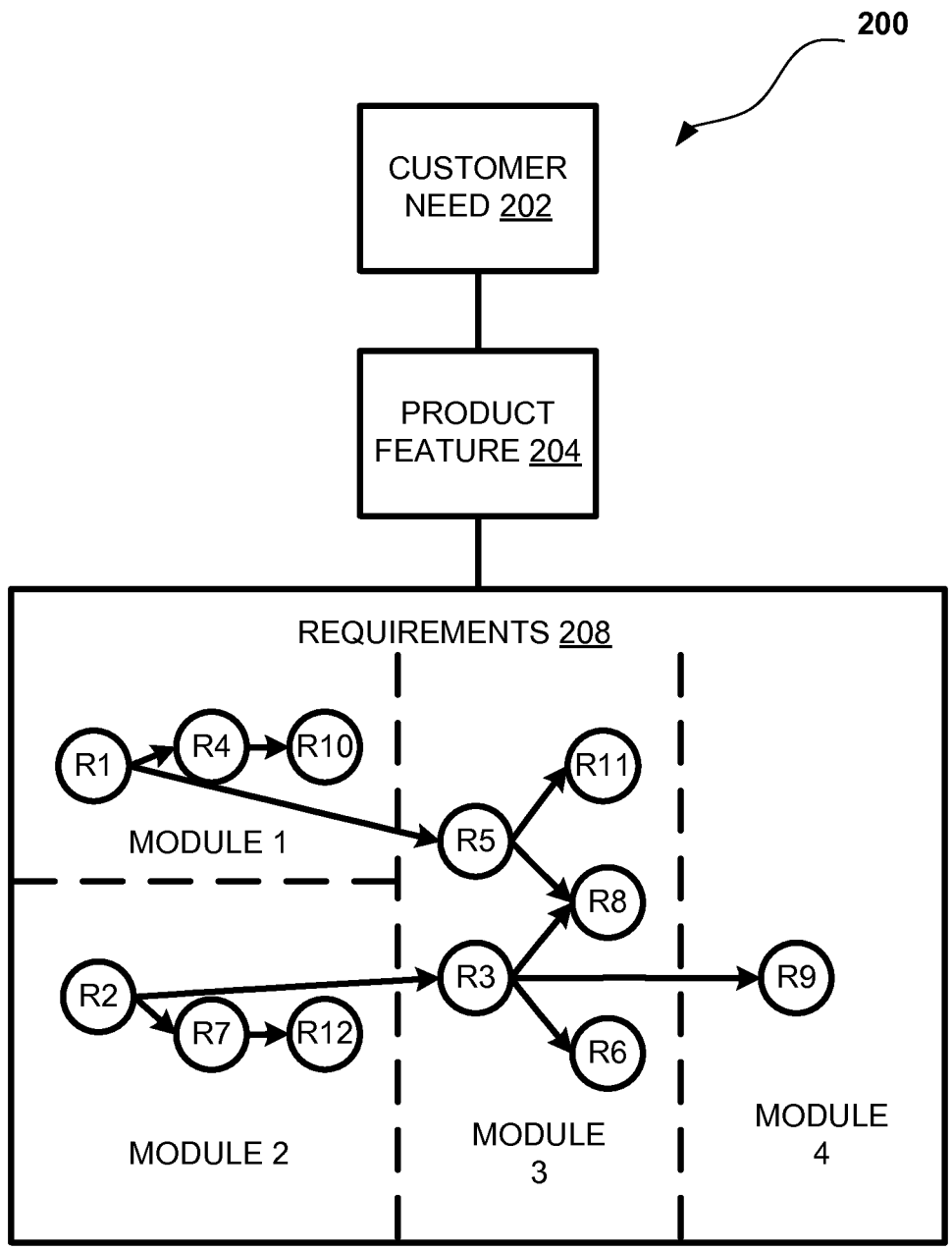
FIG. 2B depicts a hierarchical cluster requirements graph, consistent with embodiments of the present disclosure.

FIG. 2A depicts an input linked normalized requirements graph 200 used to generate a hierarchical cluster requirements graph 208 shown in FIG. 2B, consistent with embodiments of the present disclosure. The graph 200 includes, a customer need 202, a product feature 204 to satisfy the customer need 202, and twelve requirements 206, R1-R12, that may be met to produce the product feature 204. For example the graph 200, a relationship between two requirements is shown by a linking arrow, pointing from a first requirement to a second requirement. Also, all relationships are assumed to be "derived from" relationships. For instance, R1 has an arrow pointing to R5, meaning R5 is derived from R1. This means that the relationships shown by a linking arrow have equal cohesion strength. Furthermore, there may be a parameter that indicates there can not be more than 5 requirements clustered together.

As shown in FIG. 2A, requirements R1-R12 may be necessary to satisfy the product feature 204. Several requirements are derived from other requirements. For instance, R3 and R7 are derived from R2 and R8 is derived from both R3 and R5. The graph factorizer 112, from FIG. 1, may operate on the input linked normalized requirements graph 200. The graph factorizer 112 may use factorization clustering techniques to generate the hierarchical cluster requirements graph 208 in FIG. 2B. As shown in FIG. 2B, the graph factorizer 112 may have determined that cuts should be made on the "weak" links between R1 and R5, R2 and R3, and between R3 and R9. Furthermore, R1, R4, and R10 are separated from R2, R7, and R12 based upon the maximum parameter value of 5 requirements to a cluster.

Figure 3A:
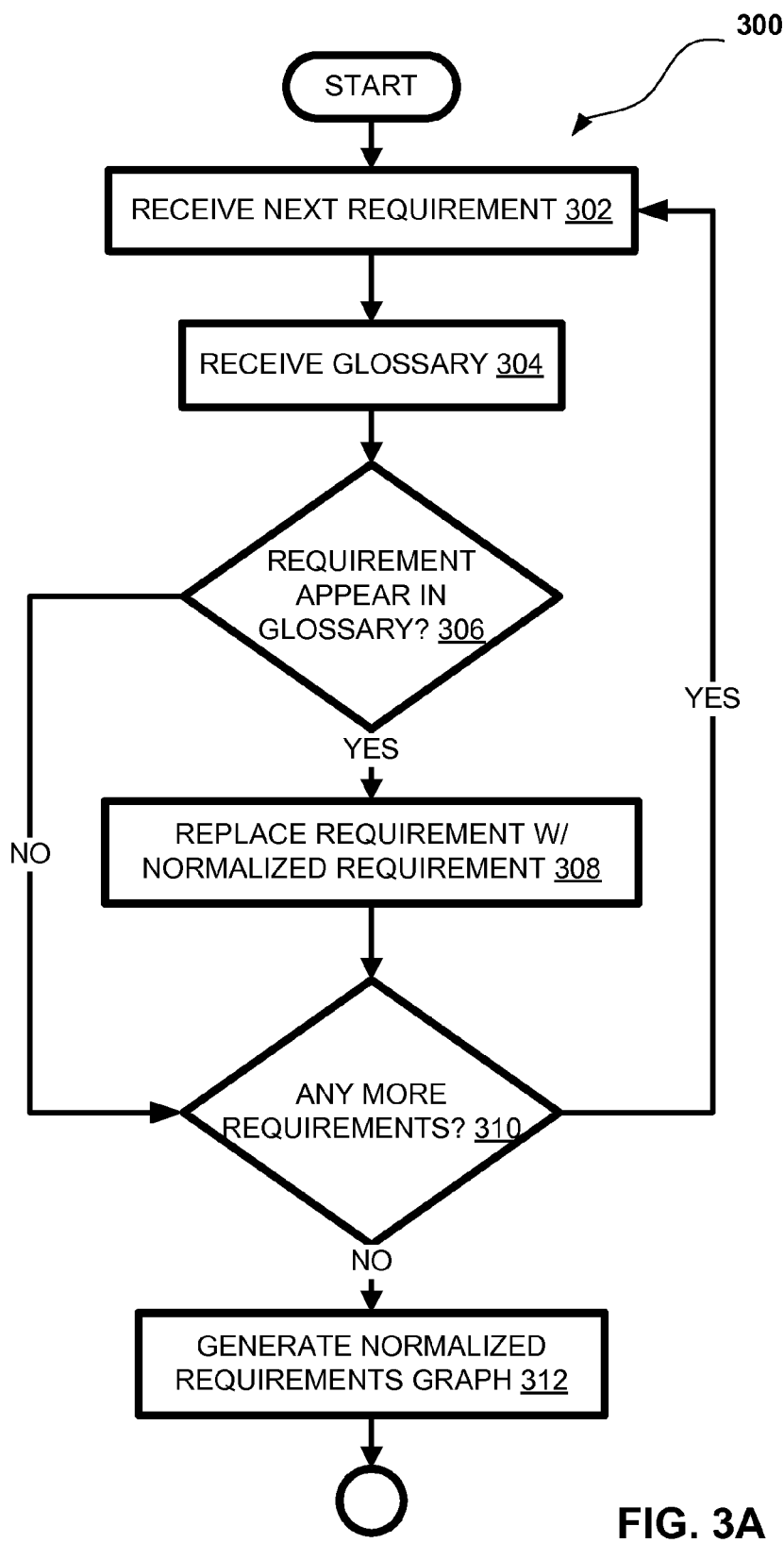
FIG. 3A depicts a first part of a process for factorizing a requirements graph and generating a hierarchical cluster requirements graph, consistent with embodiments of the present disclosure.

FIG. 3A depicts a first part of a process 300 for factorizing a requirements graph and generating a hierarchical cluster requirements graph, consistent with embodiments of the present disclosure. In operation 302, a requirement may be received. The requirement may be received from a requirements catalog such as the requirements catalog 102, from FIG. 1. The requirement may be in a natural language and a text document may be included that has a definition of the requirement. The text document may be an export from a requirements management tool, and the like.

In operation 304, a glossary may be received. The glossary received may enable authoring, management, and sharing of business terms. In an embodiment, the glossary 106, from FIG. 1, may be the glossary received.

Operation 306 may determine whether the requirement appears in the glossary. If the requirement appears in the glossary then, in operation 308, the requirement may be replaced with its synonym, thus, normalizing the requirement. If, however, the requirement is not in the glossary then, the glossary may not have a synonym to replace the requirement. However, the requirement may not be removed from the received requirements because that requirement may be necessary to satisfy a consumer need. Therefore, the original requirement is already in its normalized form and the process 300 may proceed to operation 310.

Illustratively, operation 310 may determine whether there are any more requirements. If there are more requirements, the next requirement may be received in operation 304. If, however, all the requirements have been received, the process 300 may proceed to operation 312.

Consistent with various embodiments, a normalized requirements graph may be generated in operation 312. The normalized requirements graph may have a plurality of normalized requirements represented by nodes. The nodes may also be connected by lines. The lines may represent the types of relationships that the normalized requirements share with one another. Furthermore, multiple lines may exist between the same nodes.

Figure 3B:
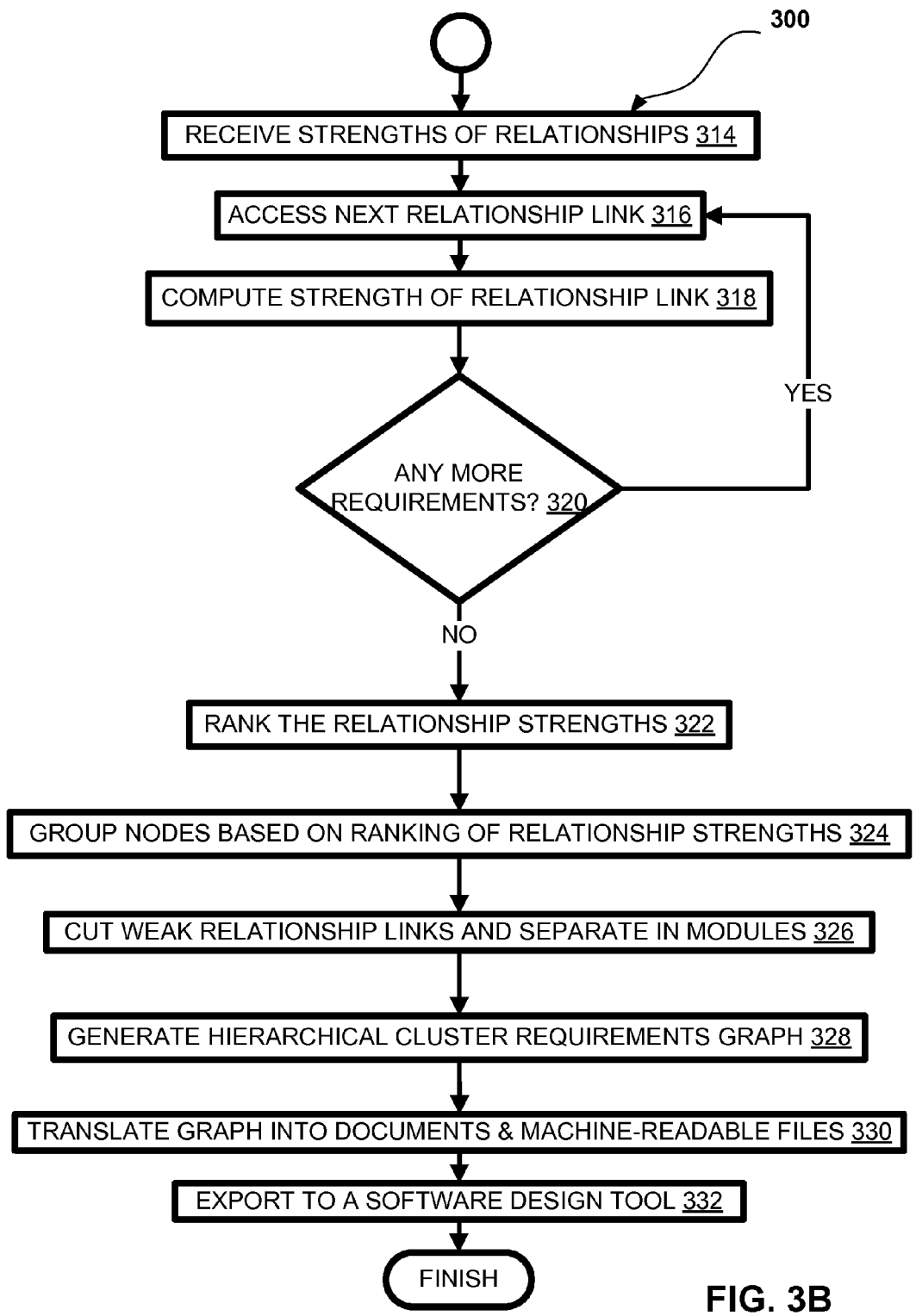
FIG. 3B depicts a continuation of the process for factorizing a requirements graph and generating a hierarchical cluster requirements graph, consistent with embodiments of the present disclosure.

FIG. 3B depicts a continuation of the process 300 for factorizing a requirements graph and generating a hierarchical cluster requirements graph, consistent with embodiments of the present disclosure. In operation 314, the strengths of the relationships may be received. As stated, the strength of the relationship may be determined by the type of relationship between requirements. For instance, the relationships such as "requirement A is fulfilled by requirement B," or "requirement A is part of requirement B," or "requirement A is derived from requirement B," etc., may be given a weight or cohesion strength reflective of whether the relationship is considered "strong", "weak", or "moderate." Furthermore, the strength of the relationship may be user-defined, or have a default strength value, etc. Also, there may be a maximum number of requirements allowed in each module. This maximum number may be dependent on a parameter that may be determined by a system dependent threshold value, a user-defined threshold value, a default value, etc.

In operation 316, a link or line representing a type of relationship may be accessed. In operation 318, the strength of the relationship may be computed using the received strengths from operation 314. Operation 320 may then determine whether there are any more relationships to access. If there are more relationships, the next relationship may be accessed in operation 316. If there are no more relationships to access, the relationships may be ranked according to strengths in operation 322.

In operation 324, the requirements may then be grouped using hierarchical clustering techniques into a cluster with other requirements that may share a "strong" relationship with the requirement, forming a cluster requirements graph. In operation 326, "weak" or non-existence links may be "cut." In an embodiment, there may be a parameter that indicates the maximum number of nodes in a cluster and the parameter may influence which "strong", "moderate", "weak" or non-existence links are cut. In operation 328, the clusters may then be separated into modules and each module may include one cluster. The modules may delineate one cluster from another cluster and form a hierarchical cluster requirements graph. In operation 330, the hierarchical cluster requirements graph may be translated into both printable documents, to be used by project managers, IT architects, developers, testers, etc. and machine-readable files. In operation 332, the machine-readable files may then be exported to be imported to software design tools.

Operation 316 to operation 328 may be explained in the following example. Relationship 1 may be initially accessed from the normalized requirements graph. A strength value of 3 may be given to a "part of" relationship, a strength value of 2 may be given to a "fulfilled by" relationship, and a strength value of 1 may be given to a "derived from" relationship. Relationship 1 may be a "part of" relationship, linking requirement A to requirement B, and may be given a cohesion strength of 3. Relationship 2 may then be accessed from the normalized requirements graph. Relationship 2 may be a "fulfilled by" relationship, linking requirement B to requirement C, and may be given a cohesion strength of 2. Relationship 3 may then be accessed from the normalized requirements graph. Relationship 3 may be a "derived from" relationship, linking requirement C to requirement D, and may be given a cohesion strength of 1.

The relationship strengths may then be ranked. In this example, the relationship between requirement A and requirement B is the strongest, the relationship between requirement B and requirement C is the second strongest, and the relationship between requirement C and requirement D is the weakest. Requirement A and requirement B may then be grouped closest together, next requirement B and requirement C are grouped second closest together, and requirement C and requirement D are farthest from one another. Furthermore, in this example, requirement A and requirement B have no relationship with requirement D so the link between them is non-existent.

The weak or non-existent relationships may then be cut. Furthermore, in this example, a parameter may be set that allows a maximum of 3 requirements to each cluster. The weak link between requirement C and requirement D may be cut and the non-existent links between requirement A and requirement D and requirement B and requirement D may be cut. Requirements A, B, and C may then be separated into one module and requirement D may be separated into another module. This will satisfy the maximum amount of nodes in a cluster determined by the parameter of 3 and the hierarchical cluster requirements graph may then be generated.

While the foregoing is directed to exemplary embodiments, other and further embodiments of the disclosure may be devised without departing from the basic scope thereof, and the scope thereof is determined by the claims that follow.

Figure 4:
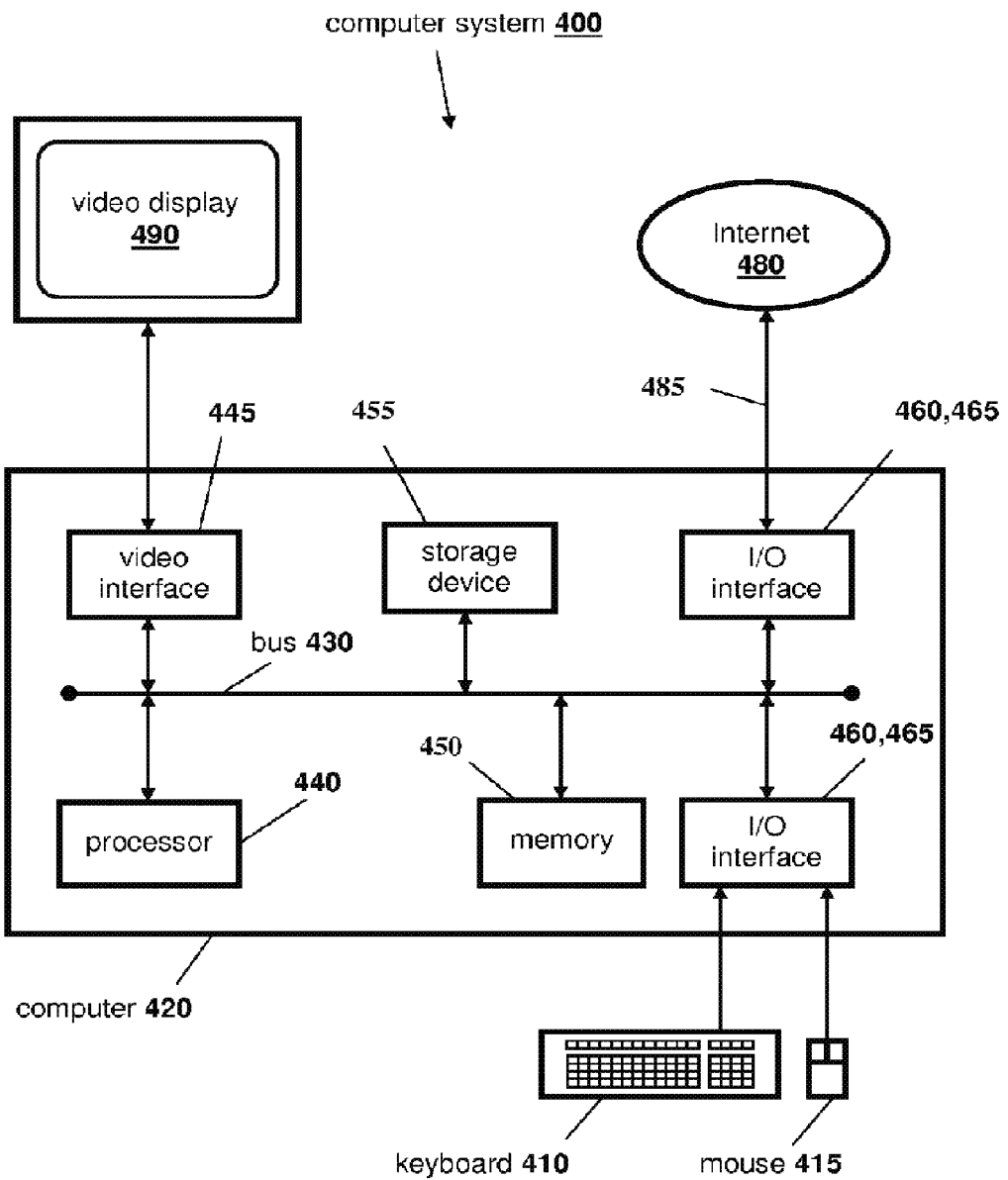
FIG. 4 depicts a schematic representation of a computer system of a type that is suitable for executing computer software for a requirements factorization mechanism, consistent with embodiments of the present disclosure.

FIG. 4 depicts a schematic representation of a computer system 400 of a type that is suitable for executing computer software for a requirements factorization mechanism, consistent with embodiments of the present disclosure. Computer software executes under a suitable operating system installed on the computer system 400, and may be thought of as comprising various software code means for achieving particular steps.

The components of the computer system 400 include a computer 420, a keyboard 410 and mouse 415, and a video display 490. The computer 420 includes a processor 440, a memory 450, input/output (I/O) interfaces 460, 465, a video interface 445, and a storage device 455.

The processor 440 is a central processing unit (CPU) that executes the operating system and the computer software executing under the operating system. The memory 450 includes random access memory (RAM) and read-only memory (ROM), and is used under direction of the processor 440.

The video interface 445 is connected to video display 490 and provides video signals for display on the video display 490. User input to operate the computer 420 is provided from the keyboard 410 and mouse 415. The storage device 455 can include a disk drive or other suitable storage medium.

Each of the components of the computer 420 may be connected to an internal bus 430 that includes data, address, and control buses, to allow components of the computer 420 to communicate with each other via the bus 430.

The computer system 400 can be connected to one or more other similar computers via an input/output (I/O) interface 465 using a communication channel 485 to a network, represented as the Internet 480.

The computer software may be recorded on a portable storage medium, in which case, the computer software program is accessed by the computer system 400 from the storage device 455. Alternatively, the computer software can be accessed directly from the Internet 480 by the computer 420. In either case, a user can interact with the computer system 400 using the keyboard 410 and mouse 415 to operate the programmed computer software executing on the computer 420.

Other configurations or types of computer systems can be used to execute computer software that assists in implementing the techniques described herein.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The invention claimed is:

1. A system for factorizing a set of requirements, the system comprising:
   a memory to store program instructions of a catalog normalizer, a graph generator, a graph factorizer, and an output generator;
   a processor to execute the program instructions stored in the memory, wherein, when executed by the processor, the catalog normalizer:
     receives a first plurality of requirement terms,
     receives a glossary having a second plurality of requirement terms with matching requirement term synonyms,
     determines whether a first requirement term from the first plurality of requirement terms is identical to a second requirement term in the glossary, and
     replaces the first requirement term with a matching requirement term synonym of the second requirement term based on the first requirement term being identical to the second requirement term;
   the graph generator generates a first graph having a plurality of matching requirement term synonyms represented by nodes connected by lines, each line representing a type of relationship;
   the graph factorizer:
     determines a relationship strength between the nodes based on the type of relationship represented by the lines connecting the nodes, and
     groups the plurality of matching requirement term synonyms into one or more clusters based on the relationship strength between the nodes; and the output generator:
- separates the one or more clusters into one or more modules based on relationship strength between the nodes and a maximum number of requirements allowed in each module,
- generates a second graph having the one or more modules,
- translates the second graph into human-readable documents and machine-readable files, and
- exports the machine-readable files to a software design tool.

2. The system of claim 1, wherein the output generator receives a parameter that indicates the maximum number of requirements allowed in each module, the memory further storing program instructions of a requirement linking tool, wherein:
- the requirement linking tool, when executed by the processor, links the plurality of matching requirement term synonyms to one another based on a relationship.

3. The system of claim 2, wherein the parameter is one of a system dependent threshold value, a user-defined threshold value, and a default value.

4. The system of claim 1, wherein the second graph is a hierarchical cluster requirements graph.

5. The system of claim 1, wherein the plurality of matching requirement term synonyms are grouped into the one or more clusters according to hierarchical graph factorization clustering.

6. The system of claim 1, wherein the first plurality of requirement terms is a requirements catalog having a list of natural-language requirements from one of a text document and a requirements management tool.

7. The system of claim 1, wherein the human-readable documents are used by one of project managers, IT architects, software developers, and software testers.

* * * * *